Dec. 10, 1929.  G. W. OLSON  1,739,412
RING CLAMPING MECHANISM FOR MILLING MACHINES
Filed March 14, 1927   4 Sheets-Sheet 1
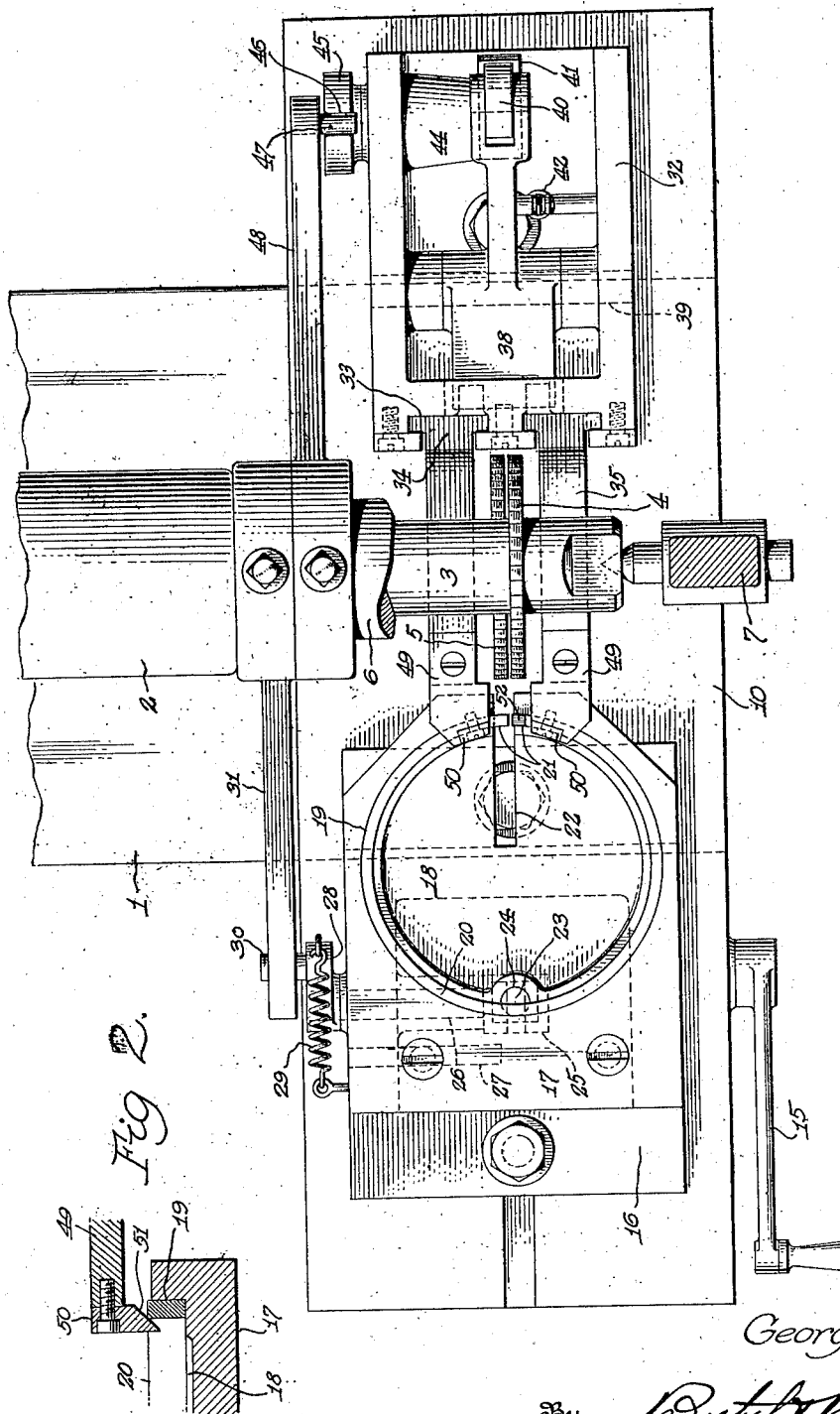
Inventor
George W. Olson,
By
Attorneys Dec. 10, 1929.  G. W. OLSON  1,739,412
RING CLAMPING MECHANISM FOR MILLING MACHINES
Filed March 14, 1927  4 Sheets-Sheet 2
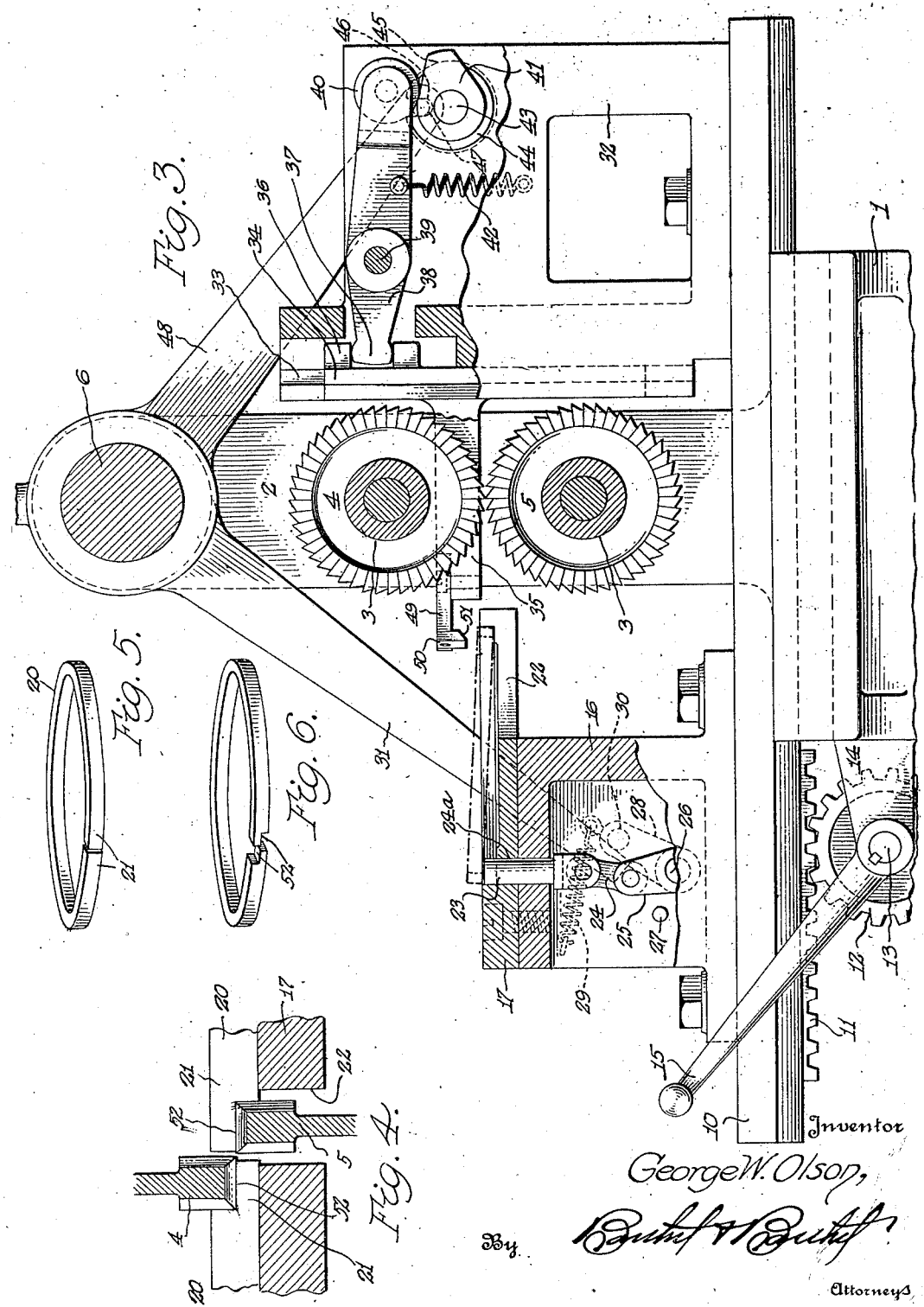
Inventor
George W. Olson,
By
Attorneys

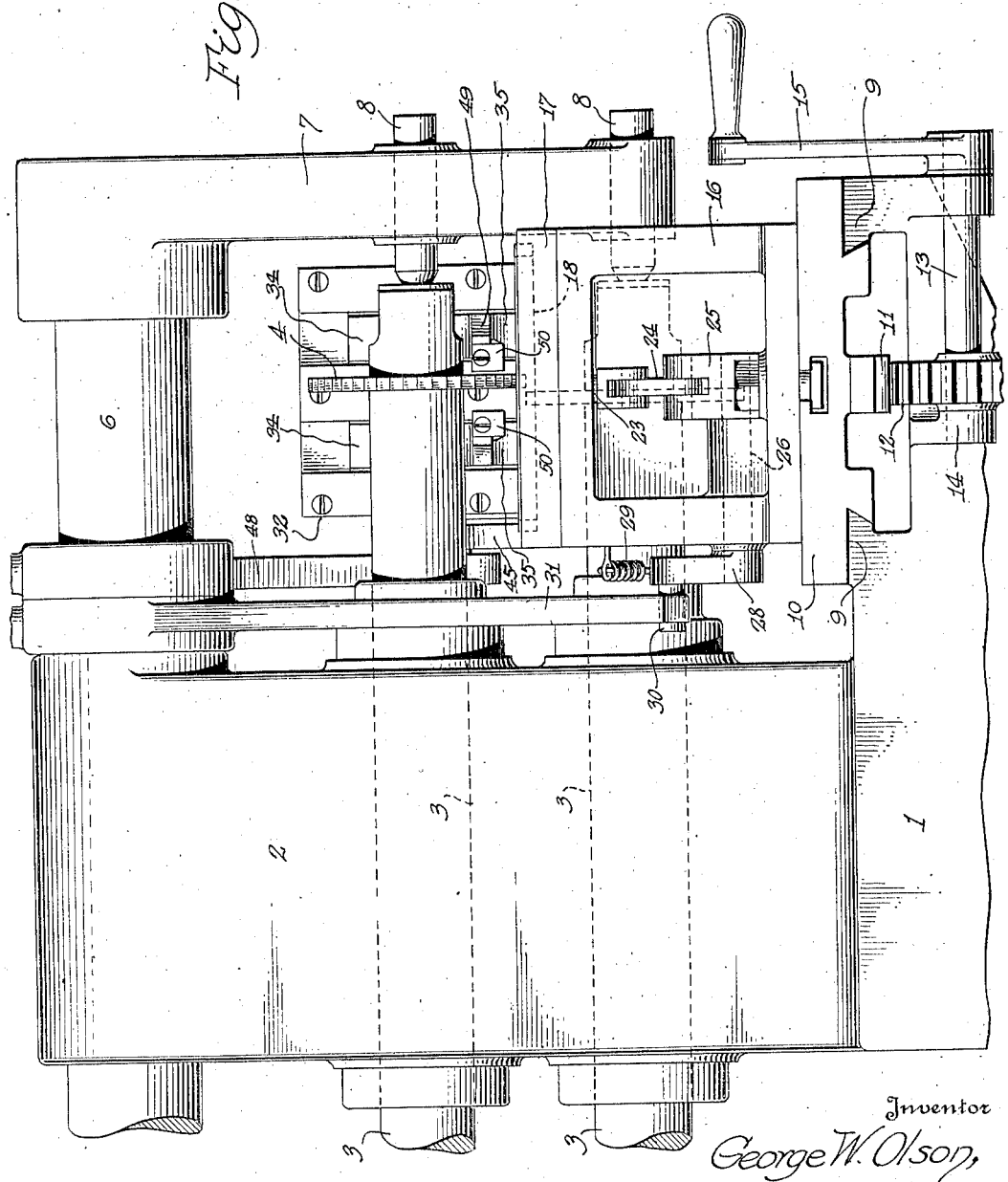

Dec. 10, 1929. G. W. OLSON 1,739,412
RING CLAMPING MECHANISM FOR MILLING MACHINES
Filed March 14, 1927 4 Sheets-Sheet 4
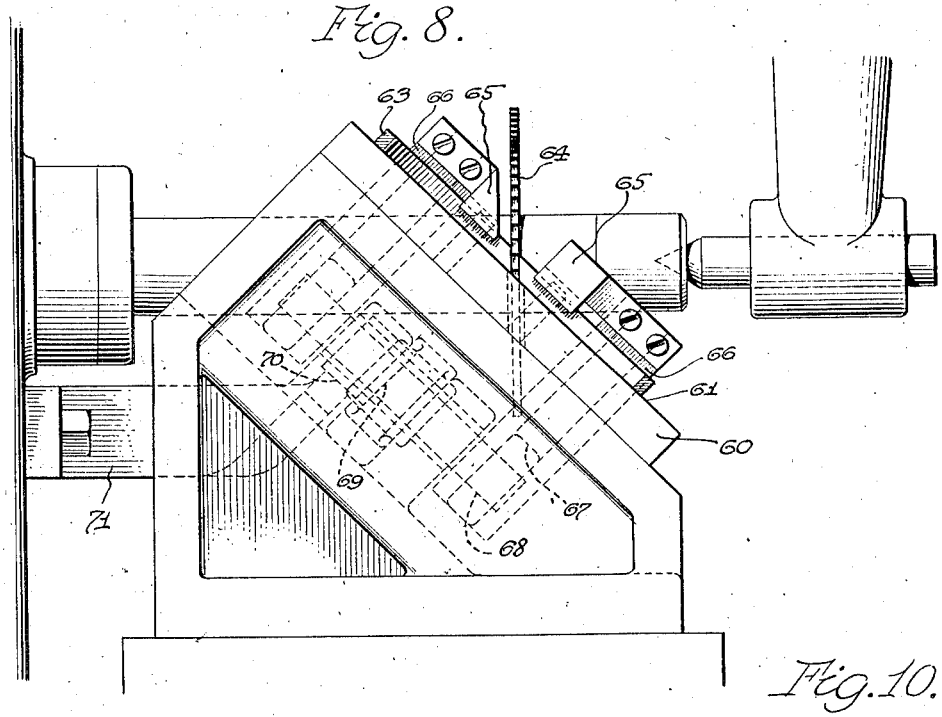
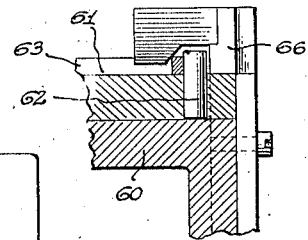
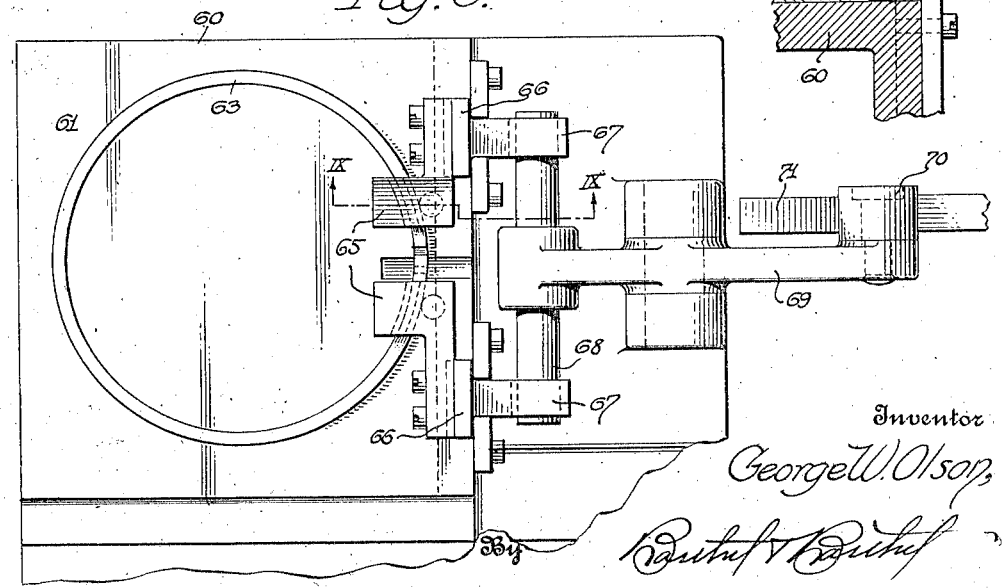
Inventor
George W. Olson,
By
Attorneys Patented Dec. 10, 1929

1,739,412

UNITED STATES PATENT OFFICE

GEORGE W. OLSON, OF MUSKEGON, MICHIGAN

RING-CLAMPING MECHANISM FOR MILLING MACHINES

Application filed March 14, 1927. Serial No. 175,139.

In my Patent No. 1,543,611 dated June 23, 1925, there is disclosed a milling machine attachment, which includes among other things, clamping jaws for temporarily holding a piston ring so that it may be operated upon by cutting instrumentalities for splitting the ring, whereby it will have a gap or opening of described configuration. There are various forms of ring ends, all of which depends on the manipulation of the cutting instrumentalities and the position of the ring relative thereto. An examination of the patent will show that the clamping jaws are comparatively flat. As a result of the use of such jaws the ends of a ring would recede or back away from cutters when encountering the same, because of slippage under the flat clamping jaws. This resulted in what is commonly known as "open" rings, that is, rings having too much stock removed and such rings were practically a total loss. Furthermore, the inability of the clamping jaws to hold the rings when shifted into engagement with cutters resulted in the ring ends being scraped and imperfect slots or split ends produced, which when gauged for size, had to be discarded. All of this contributes to low production and considerable waste. It is in this connection that my invention aims to increase production and eliminate waste by holding the piston rings so that the split ends thereof cannot shift during a cutting operation. Positive and reliable clamping means are employed for this purpose with the result that a predetermined cut is accurately made and there is no waste whatsoever from this particular operation on the piston rings.

I also found that my milling machine attachment, as disclosed in my patent, did not afford a requisite degree of accessibility to the machine, so I have redesigned my attachment so that a workman can easily observe all operations, quickly manipulate piston rings relative to the milling machine, and safely operate the machine. My improvements may be also considered as more simple in construction, easier to install, and obviously there will be greater efficiency in the operation of cutting or slotting piston rings to provide a desired joint.

Reference will now be had to the drawings, wherein

Figure 1 is a plan of a portion of a milling machine including my improvements;

Fig. 2 is a detail sectional view of a clamping jaw showing the manner in which it engages a piston ring;

Fig. 3 is a vertical longitudinal sectional view of that portion of the milling machine shown in Fig. 1;

Fig. 4 is a horizontal sectional view of a portion of the milling machine showing how the offset cutters will produce a stepped joint for a piston ring;

Fig. 5 is a perspective view of a piston ring split preparatory to having its split ends stepped by cutting instrumentalities;

Fig. 6 is a perspective view of a piston ring having a stepped joint;

Fig. 7 is a front elevation of that portion of the milling machine shown in Figs. 1 and 3;

Fig. 8 is a side elevation of a portion of the milling machine showing a ring held for an angle cut;

Fig. 9 is a plan of the ring holder, and

Fig. 10 is a detail sectional view on the line IX—IX of Fig. 9.

In order that my improvements may be clearly understood I have deemed it necessary to show a portion of a milling machine which includes a bed 1 having a side housing 2 for driven arbors 3 which support cutters 4 and 5. As a matter of good construction the housing 2 is ordinarily provided with an arm or arbor 6 supporting a bracket or hanger 7 provided with center bearings 8 for the ends of the arbors 3.

The bed 1, at the side of the housing 2, is provided with ways 9 for a carriage 10, having a longitudinal rack 11 meshing with a pinion 12 mounted on a shaft 13, journaled in brackets 14, carried by the bed 1 of the machine. On the outer end of the shaft 13 is a crank 15 by which the shaft 13 may be rocked or rotated to reciprocate the carriage 10 and shift it back and forth below the driven rotary cutters 4. Obviously a timed or intermittently operated power device may be substituted for the crank 15.

Adjustably mounted on the carriage 10 is a hollow table 16 provided with a horizontally disposed work support or ring holder 17, best shown in Figs. 1 and 3. The top of this ring holder has an annular recess 18 with an upstanding wall 19 against which a split piston ring 20 is placed with the ends 21 of the ring at a longitudinal cutter clearance slot 22 in the ring holder. The ring 20 is adapted to be set in the recess to snugly engage the annular upstanding wall 19 and to facilitate removing the ring, after it has been operated upon by the driven rotary cutters 4 and 5, the table 16 is provided with a ring ejector or elevating device. A practical embodiment of this ring ejector includes a vertically disposed ejector pin 23 slidable in registering openings 24ª provided therefor in the table 16 and the ring holder 17. The lower end of the ejector pin 23 is pivotally connected by a link 24 to the crank 25 of a rock shaft 26, journaled in the table 16. The crank 25 and the link 24 have the action of a toggle which permits rocking movement of the shaft 26 reciprocating the ejector pin 23. In the table 16 may be a stop pin 27 to limit the movement of the crank 25.

The shaft 26 protrudes from the off side of the table 16 and has a crank 28, connected by a coiled retractile spring 29 to the table 16. The retractile force of the spring 29 retains the ejector pin 23 normally lowered. On the crank 28 is a pin 30 adapted to impinge against an angularly disposed arm 31 fixed on the arbor or arm 6. The arm 31 serves as an abutment extending into the path of travel of the pin 30, so that as the carriage 17 and table 10 recede from a cutting operation the pin 30 will strike the arm 31 and cause the shaft 26 to be rocked with the result that the ejector pin 23 is raised and elevates that portion of the piston ring 20 resting on the upper end of the ejector pin. This is best shown in Fig. 3 where dot and dash lines show the ring 20 as having been elevated sufficiently to permit of a workman removing the ring.

On the rear end of the carriage 10 is a housing 32 provided with vertically disposed ways 33 for the slides 34 of horizontally disposed clamping arms 35. The rear faces of the slides 34 are provided with sets of lugs 36 and extending between said lugs is the head 37 of a beam 38 mounted on a rock shaft 39 journaled in the housing 32. The rear end of the beam 38 is bifurcated to accommodate an anti-frictional roller 40 normally held in engagement with a cam 41 by the retractile force of a coiled spring 42 connecting the beam to the housing 32. The crank 41 is mounted on a rock shaft 43 journaled in a bearing 44 carried by the housing 32. One end of the rock shaft 43 has a slotted head 45 and extending into the slot 46 of said head is a pin 47 carried by an angularly disposed arm 48 mounted on the arbor or arm 6.

As a result of this constructive arrangement of parts reciprocation of the carriage 10 and the housing 32 causes the shaft 43 to be rocked, because the head 45 is articulated with the stationary arm 48, consequently the head 45 will be turned and thus rock the shaft 43 to cause the cam 41 to rock the beam 38. This beam will reciprocate the slides 34 and raise and lower the clamping arms 35, which extend between the arbors 3 and protrude at the front side of the machine. The reciprocation of the slides 34 is such as to define open and closed positions for the arms 35 relative to the work holder 17. In passing it might be mentioned that the slides 34 may be in the form of a single slide head operatable by the beam 38.

Detachably connected to the forward ends of the clamping arms 35 are extensions 49 provided with detachable hardened jaws 50 having beveled faces 51. The clamping jaws 50 are adapted to engage the inner wall of the piston ring 20, contiguous to the split ends 21 thereof. Downward pressure of the clamping jaws 50 not only firmly seats the ring 20 on the holder 17, but firmly clamps the ends of the ring against the upstanding wall 19. This is accomplished by the beveled faces 51 of the jaws 20 and during the cutting operation it is practically impossible for the split ends 21 of the ring to raise or back away from the wall 19 at the cutter clearance slot 22.

I attach considerable importance to these beveled clamping jaws because the ends of the piston ring cannot yield when encountering the driven rotary cutters 4 and 5. Each end of the ring is held and if the cutters 4 and 5 are offset, as shown, for producing a stepped joint, such as designated 52 in Fig. 6, the ring ends will receive a predetermined cut with no chance of the ring ends yielding which would cause a scraping operation and an imperfect ring. Another feature is that of clamping the ring on its inner edge whereby the jaws 50 cause no disfiguration on the side of the ring.

In operation, the ring 20 is placed in the recess 18 of the holder 17 and the carriage 10 moved forward by a throw of the crank 15. Just before the ring 20 encounters the driven rotary cutters 4 and 5 the clamping jaws 50 engage the split ends of the ring and hold said ends snugly against the wall 19 during the cutting operation. As soon as the ring clears the cutters, on a back or receding stroke of the carriage 10, the clamping jaws 50 are raised and the ejector pin 23 is successively actuated to eject the ring.

I also attach considerable importance to the clamping arms 35 extending between cutter arbors from the rear side of the milling machine, because this leaves the front side of the milling machine clear for the manipulation of rings relative to the ring holder. In other words there is easy access to the ring holder whereby a workman may speed up operations for a large production.

As showing the adaptation of my invention for an angularly cut ring, see Figs. 8, 9 and 10, wherein a table or ring holder 60 has a flat surface or face 61 disposed at an angle to the horizontal. The holder 60 has a set of pins or shoulders 62 against which a ring 63 may be placed and cut on a bias by a cutter 64. The ring is held by clamping jaws 65, one of which affords ample clearance for the cutter 64. The clamping jaws 65 are supported by slides 66 having lugs 67 engaged by a cross head 68 on a rockable beam 69. On the beam is a roller 70 engaging a stationary cam arm 71 and when the ring holder carriage is reciprocated, the beam 69 will be rocked to raise and lower the clamping jaws 65.

Since my invention resides in the table 16, the housing 32, and the appurtenant parts thereof, it is obvious that these devices or attachments are applicable to any milling machine having a reciprocable carriage and provision for supporting the arms 31 and 48 which causes my mechanisms to be operated in timed relation during reciprocation of the carriage. For this reason I do not care to confine my invention to any particular type of milling machine, and I would also have it understood that the structural elements entering into my invention are susceptible to such changes as are permissible by the appended claims.

Having thus fully described my invention what I claim is:—

1. A milling machine embodying a reciprocable carriage, driven rotary cutters, a ring holder on said carriage adapted to have a ring seated therein and held during an opperation of said cutters on said ring, movable clamping jaws having beveled work-engaging faces adapted to enter said holder and bear against the inner circumference of the ring to bind the ring in the holder, and means operable by the movement of the carriage for bringing said jaws into clamping position when said holder is at said cutters.

2. A milling machine embodying a reciprocable carriage, driven rotary cutters, a ring holder on said carriage adapted to have a ring seated therein and held during an operation of said cutters on said ring, movable clamping jaws having beveled work-engaging faces adapted to enter said holder and bear against the inner circumference of the ring to bind the ring in the holder, means operable by the movement of the carriage for bringing said jaws into clamping position when said holder is at said cutters, and a ring ejector carried by said holder and adapted to cooperate with stationary parts of the machine to eject a ring from said holder on withdrawal of said holder from said cutters.

3. A milling machine embodying a reciprocable carriage, driven rotary cutters, a ring holder on said carriage adapted to have a ring seated therein and held during an operation of said cutters on said ring, movable clamping jaws having beveled work-engaging faces adapted to enter said holder and bear against the inner circumference of the ring to bind the ring in the holder, and a ring ejector carried by said holder and adapted to cooperate with stationary parts of the machine to eject a ring from said holder on withdrawal of said holder from said cutters.

4. A milling machine comprising rotary driven cutters, a ring holder having a seat adapted to receive a ring to be operated upon by said cutters, jaws adapted to enter said seat at a comparatively outward portion thereof, and means for drawing said jaws against the inner circumference of a ring mounted in the seat, whereby to clamp said ring against the wall of the seat.

In testimony whereof I affix my signature.

GEORGE W. OLSON.